United States Patent [19]
Hundstad et al.

[11] 4,166,986
[45] Sep. 4, 1979

[54] BALLAST TECHNIQUE FOR LASER CATHODE PINS

[75] Inventors: Richard L. Hundstad, Wilkinsburg; Steve A. Wutzke, Penn Hills, both of Pa.

[73] Assignee: Westinghouse Electric Corp., Pittsburgh, Pa.

[21] Appl. No.: 805,369

[22] Filed: Jun. 10, 1977

[51] Int. Cl.² ............................................. H01S 3/097
[52] U.S. Cl. .......................... 331/94.5 PE; 331/94.5 D
[58] Field of Search ................ 331/94.5 PE, 94.5 G; 315/58, 59

[56] References Cited
U.S. PATENT DOCUMENTS

| | | | |
|---|---|---|---|
| 2,252,694 | 8/1941 | Bennett | 315/58 |
| 3,743,881 | 7/1973 | Blaszuk | 331/94.5 PE |
| 3,860,887 | 1/1975 | Hoag et al. | 331/94.5 G |
| 4,080,578 | 3/1978 | Farish et al. | 331/94.5 PE |

Primary Examiner—William L. Sikes
Attorney, Agent, or Firm—M. P. Lynch

[57] ABSTRACT

The discrete ballast resistors associated with the multiple pin array of laser cathode structures are replaced by a bulk resistive material in the form of an integral bar or slab which is maintained in contact with the plurality of pin electrodes comprising the laser cathode assembly to provide a stable ballast means. The bulk resistive member employed to provide the ballast for the pin electrodes can exhibit non-linear resistive characteristics to provide greater laser discharge stability with less power dissipation.

4 Claims, 6 Drawing Figures

BALLAST TECHNIQUE FOR LASER CATHODE PINS

BACKGROUND OF THE INVENTION

A laser electrode assembly comprised of an X-Y array of cathode pin electrodes and a planar anode electrode for use in a high pressure gas laser is disclosed in detail in U.S. Patent Application Ser. No. 674,264 entitled "DC Excitation Of High Pressure Gas Lasers", filed Apr. 6, 1976 as a continuation of Application Ser. No. 365,387, filed May 30, 1973, and assigned to the assignee of the present invention. This application, which is incorporated herein by reference, discloses the advantages of the pin electrode array in a flowing laser gas system and discusses the technique for ballasting the individual pins through the use of discrete resistors associated with the rows and columns of the pin electrodes comprising the X-Y array. The application further indicates the potential use of an electrolyte solution contacting the pins as a basis for providing a resistive ballast between the discrete pins and a voltage supply. The resistive ballast in combination with transverse laser gas flow in the above-referenced application functions to stabilize the glow discharge.

The ballast resistors employed in the multiple pin cathode electrode assemblies must: (1) dissipate up to 30% of the input energy to the discharge; (2) be compact in order to permit a large number of pin electrodes to be assembled with densitites of up to several pins per square centimeter; (3) withstand momentary high currents and voltage in the event of arc instability; and (4) exhibit sufficient insulation to prevent electrical flashover to nearby resistors as well as surrounding parts of the laser system.

SUMMARY OF THE INVENTION

The applicants disclose herein with reference to the accompanying drawings a technique for alleviating the operational limitations and complexities inherent in the use of discrete ballast resistors with each of the individual pin electrodes. The technique consists of using bulk resistive material in the form of a single integral ballast member which is maintained in electrical contact with the pin electrodes comprising an electrode pin array. The integral bulk resistive ballast member can be fabricated or machined to include appropriate slots and openings to effectively tailor the resistive characteristics of the ballast members to achieve a desired resistive pattern. The integral resistive member can be such as to exhibit non-linear resistive characteristics to provide improved operation over that afforded by the linear discrete ballast resistors of the prior art.

Further, the ballast member can be fabricated such as to include apertures, or a porosity characteristic, which will permit the flow of a dielectric cooling fluid, such as transformer oil, through the bulk resistive ballast member.

BRIEF DESCRIPTION OF THE DRAWINGS

The invention will become more readily apparent from the following exemplary description in connection with the accompanying drawings.

DESCRIPTION OF THE PREFERRED EMBODIMENT

Figure 1:
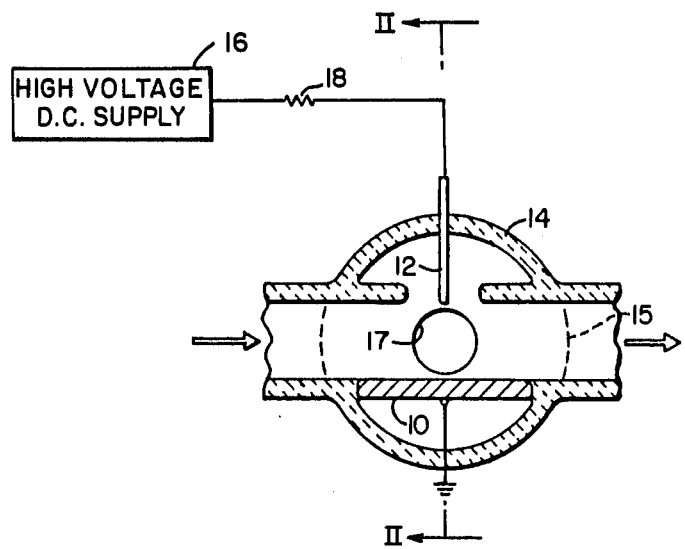
FIGS. 1 and 2 are sectioned illustrations of a cathode electrode consisting of a linear array of pin electrodes in combination with a planar anode electrode and employing individual ballast resistors for the respective pin cathode, as disclosed in the above-referenced pending application, and labeled herein as Prior Art.
Figure 2:
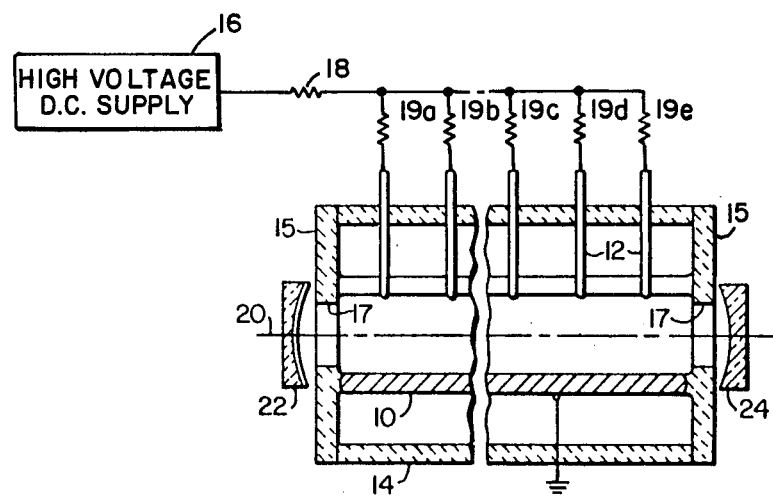

The Prior Art laser system of FIG. 1 utilizes a pin-plane electrode geometry having a gas flow transverse to the optical axis which enables the gas laser to operate under conditions of DC excitation at high pressure. In FIG. 1, electrode 10 is a planar surface continuous electrode maintained at a reference potential such as ground. Set opposite and perpendicular to electrode 10, as more clearly apparent in FIG. 2, is a row of cathode pin electrodes 12 spaced apart from electrode 10 to define a discharge gap therebetween. The electrode assembly is positioned in a laser housing 14 having end walls 15 and apertures 17 in the end walls 15. The gas flow is shown transverse to the discharge gap defined between electrodes 10 and 12. The high voltage DC power supply 16 is connected through resistor 18 to the cathode pin electrodes 12, each of which is individually ballasted by resistors 19a, 19b, 19c, 19d and 19e so adapted to establish an electric field between electrodes 10 and 12.

Figure 3:
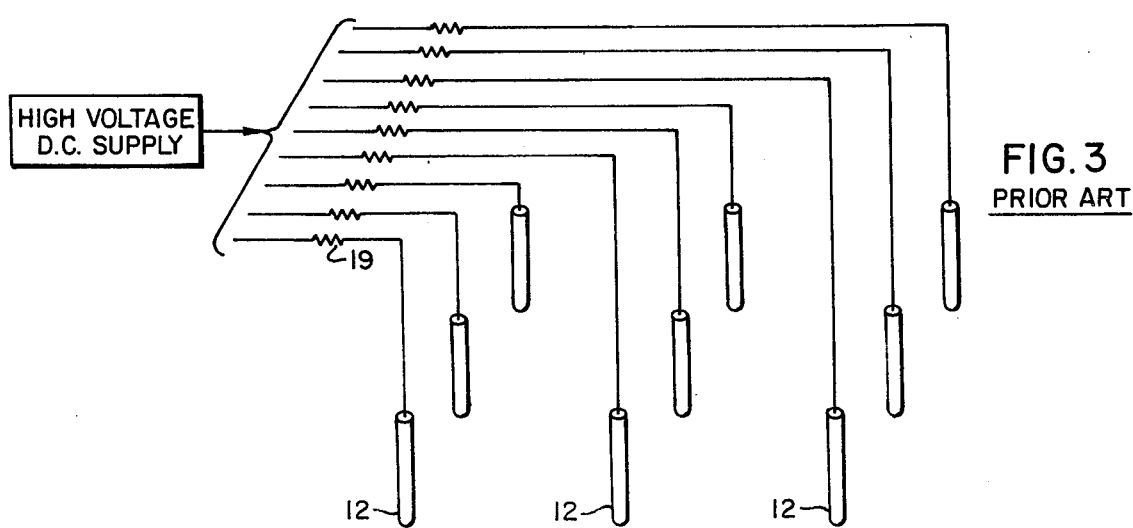
FIG. 3 is a schematic illustration of a typical X-Y array of pin electrodes comprising a Prior Art laser cathode.

The cathode pin electrodes 12 disclosed in the Prior Art illustrations of FIGS. 1, 2 and 3 operate to provide discrete current sources. The individual cathode pin electrodes function to divide the total cross-section of the discharge volume thereby giving greater selective control over the distribution of the power developed in the discharge volume.

In FIG. 2, the optical axis 20 of the laser system runs parallel to the planar surface of the electrode 10 and is aligned longitudinally with the discharge gap defined by the electrodes 10 and 12. An optical cavity is defined by the spaced optical elements 22 and 24 at each end of the laser housing 14 and aligned with apertures 17. Optical element 22 typically is completely reflecting while element 24 is partially reflecting and partially transmissive to couple coherent energy out of the cavity. In the Prior Art illustrations of FIGS. 1 and 2, the flow of the laser gas is transverse to the discharge between the cathode pin electrodes 12 and the planer anode electrode 10.

The application of DC voltage to the electrode assembly comprised of electrode 10 and 12 with the gas flowing produces a glow discharge between the electrodes thus inducing laser action by excitation of the gas. The glow discharge is established along the axis of the optical cavity. A typical laser gas flow system, while not shown, contains pumping means to move the gas at some selective velocity, heat exchanging means for cooling the gas, and means for recycling the gas through the system. Implementation of the flow system is well known in the art.

The Prior Art embodiment of FIG. 3 is merely an extension of the single row of pins illustrated in FIGS.

1 and 2 to an X-Y array of pin-type cathode electrodes 12 and associated discrete ballast resistors 19.

Figure 4A:
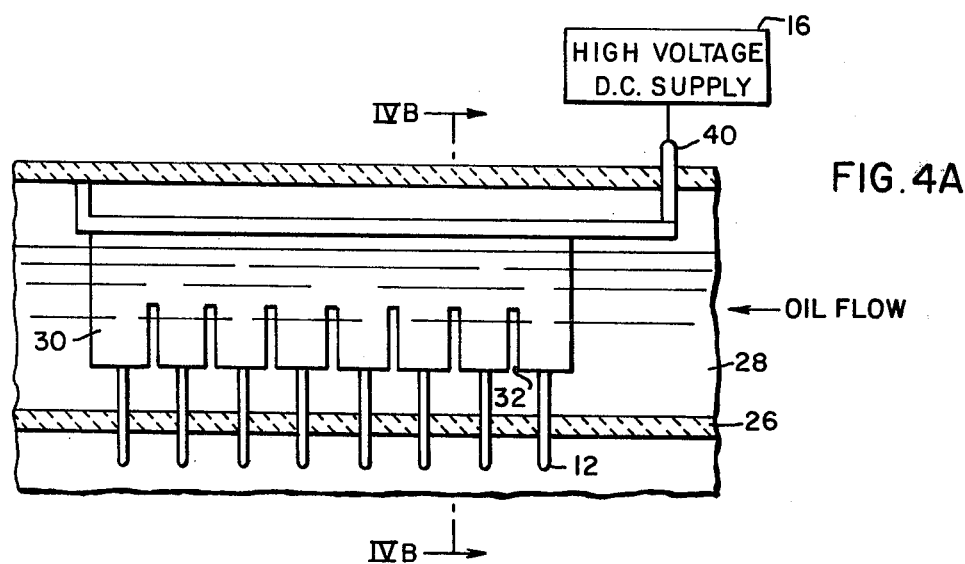
FIGS. 4A and 4B are sectioned illustrations of a laser electrode assembly similar to that of FIGS. 1, 2 and 3 wherein a bulk resistive integral ballast member has been substituted for the discrete ballast resistors of the Prior Art.
Figure 4B:
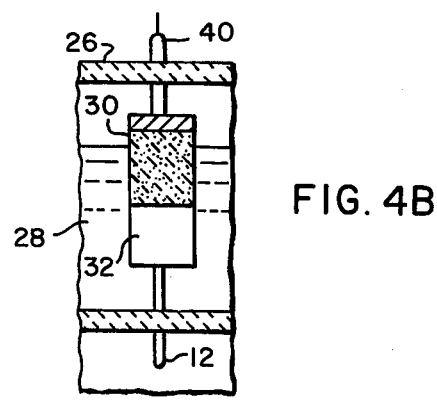

Referring to FIG. 4A, the discrete ballast resistors 19 of the Prior Art illustrations have been replaced by an integral ballast member 30 comprised of a bulk resistive material such as a graphite impregnated binder, which electrically couples the discrete cathode pin electrodes 12 to an electrical bus 40 which is connected to the DC power supply 16. A sectioned view of the combination of the integral ballast member 30 and the cathode pin electrodes 12 is illustrated in FIG. 4B. In addition to being rugged and mechanically simple to machine and work with, the bulk resistive material can withstand larger current surge loads than conventional wire-wound power resistors.

The effective resistance established between the individual cathode pin electrodes 12 and the electrical bus bar 40 can be individually determined by physically modifying the ballast member 30 such as through the use of apertures or slots 32. The precise resistance characteristics desired for the respective cathode pin electrodes 12 can be achieved during the fabrication and machining of the ballast member 30.

Cooling of the ballast member 30 can be achieved by flowing a dielectric fluid, such as transformer oil, through the passage 28 of the laser housing 26 within which is located the ballast member 30. The cooling efficiency can be increased if apertures such as those indicated as slots 32 are provided in the ballast member 30 to support a flow of the cooling fluid through the ballast member 30. Further flow-through capability can be provided if the ballast member 30 is fabricated as a porous element.

The bulk resistive material may consist of carbon particles dispersed in either a ceramic matrix or a thermally cured organic resin containing inert fillers.

Numerous non-linear bulk resistive materials could be employed. An example is barium titanate doped with appropriate rare earths to give the required positive temperature coefficient. Many of the materials used in positive temperature coefficient thermistors could be used.

Figure 5:
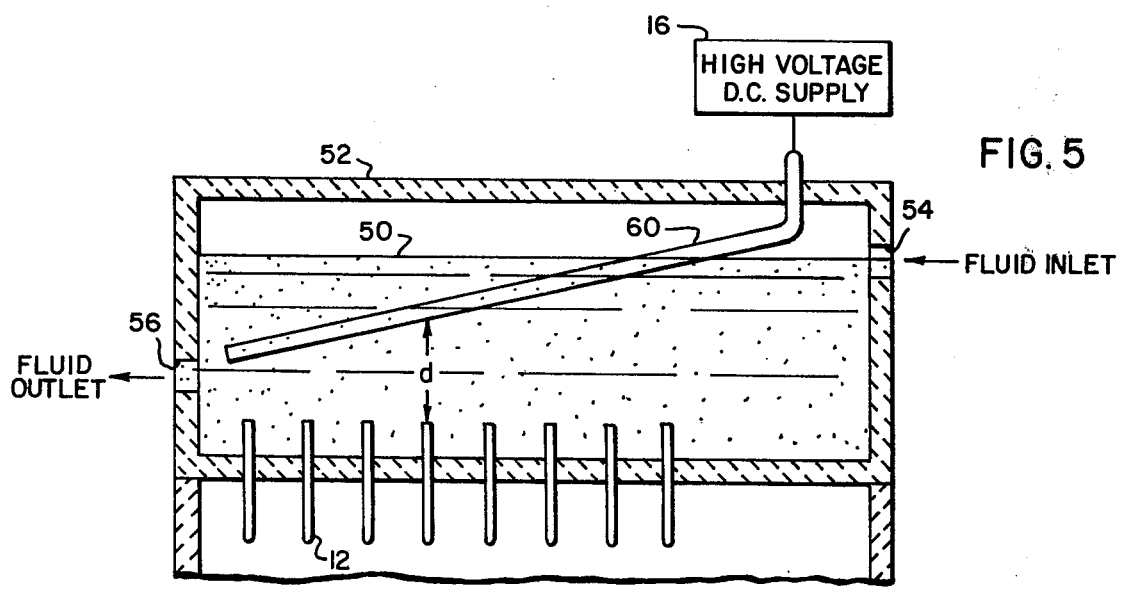
FIG. 5 is a schematic embodiment wherein the bulk ballast of FIGS. 4A and 4B is replaced with a resistive fluid.

Referring to FIG. 5, the bulk resistive material has been replaced by a resistive fluid 50 which enters housing 52 by inlet 54 and exits through outlet 56. The resistive fluid electrically couples pin electrodes 12 to an electrical bus 60. The spacing d between the pin electrodes 12 and the electrical bus 60 as shown in FIG. 5 to produce a "non-linear" resistive pattern. This technique allows for the adjustment of the discharge current density distribution. The resistive fluid 50 would typically be pumped through a heat exchanger for cooling.

A suitable resistive fluid is a dielectric fluid containing a current carrying additive, such as transformer oil with graphite mixed in it.

We claim:

1. In a laser gas system, the combination of:
    a flowing laser gas medium;
    optical elements forming a laser optical cavity;
    a cathode electrode and an anode electrode spaced apart to define a laser discharge region therebetween, said cathode electrode comprising an X-Y array of discrete cathode elements; extending in a downstream direction relative to the flowing laser gas medium;
    DC electrical excitation means operatively connected to said anode and cathode electrodes to initiate laser emission; and
    a bulk resistive member physically isolated from said flowing laser gas medium and operatively coupling said discrete cathode elements of said cathode electrode to said DC electrical excitation means, said bulk resistive member being physically configured to effectively tailor the resistive characteristic of the bulk resistive member to produce a desired resistive pattern between the individual cathode electrode elements and the DC electrical excitation.

2. In a laser system as claimed in claim 1 further including a dielectric cooling fluid contacting said bulk resistive member.

3. A method of ballasting a cathode electrode consisting of a plurality of discrete cathode elements in a flowing laser gas system, comprising the steps of,
    positioning a bulk resistive element between said plurality of discrete cathode elements and an electrical excitation means, and
    physically modifying said bulk resistive member to effectively tailor the resistive characteristic of the bulk resistive member to produce a desired ballast resistance pattern between the discrete cathode elements and the electrical excitation means.

4. A method as claimed in claim 9 further including the step of,
    cooling said bulk resistive member.

* * * * *